Jan. 20, 1970    R. McKINVEN, JR    3,490,139
SEAL AND METHOD OF FORMING THE SAME
Filed Oct. 1, 1965    2 Sheets-Sheet 1
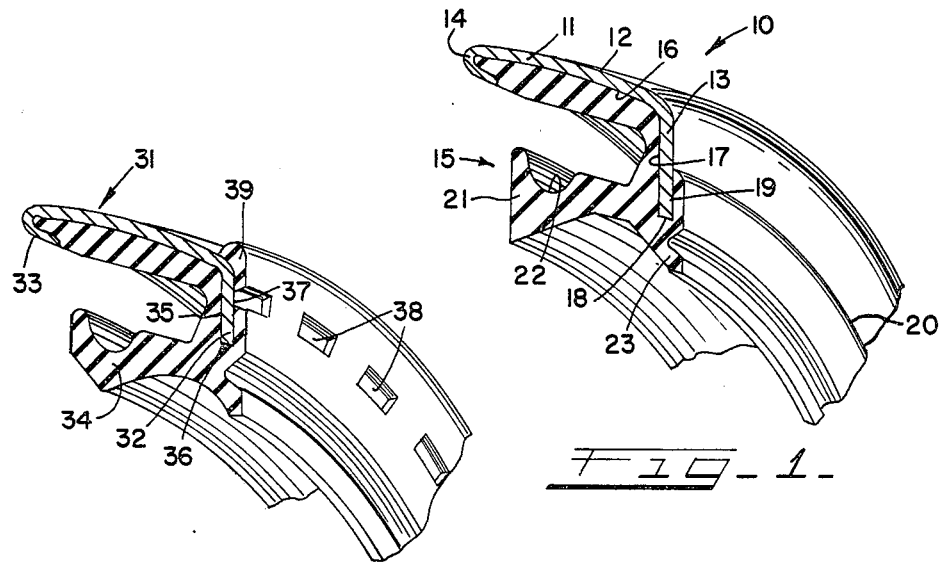
Fig. 1.
Fig. 2.
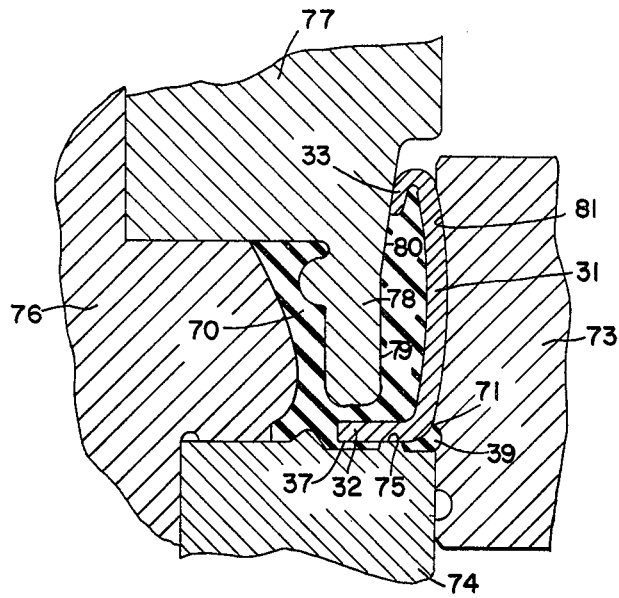
Fig. 5.
INVENTOR
ROBERT McKINVEN, JR.
BY Greist, Lockwood,
Greenawalt & Dewey ATT'YS

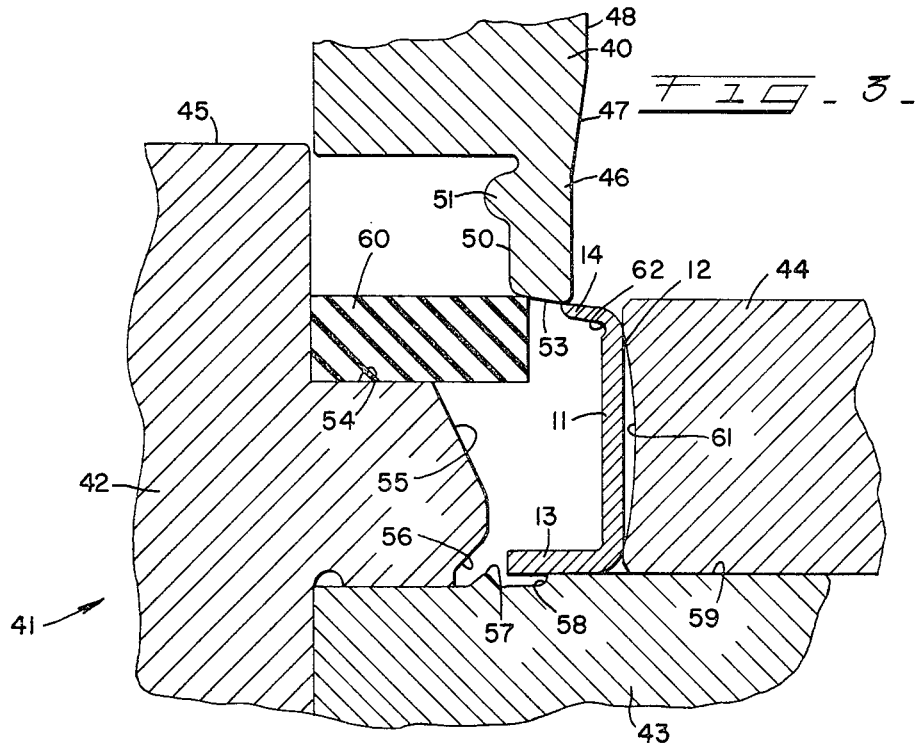
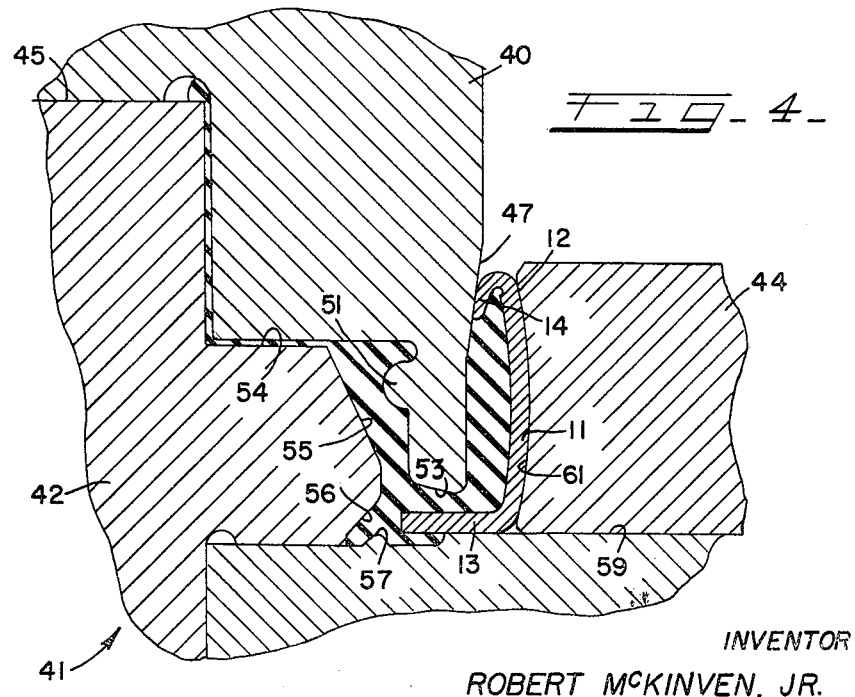

United States Patent Office

3,490,139
Patented Jan. 20, 1970

---

3,490,139
SEAL AND METHOD OF FORMING THE SAME
Robert McKinven, Jr., Detroit, Mich., assignor to Chicago Rawhide Manufacturing Company, Chicago, Ill., a corporation of Illinois
Filed Oct. 1, 1965, Ser. No. 492,190
Int. Cl. B23p 17/00, 25/00
U.S. Cl. 29—527                                 8 Claims

---

ABSTRACT OF THE DISCLOSURE

A method of flashless molding of a seal unit is described which includes disposing a seal casing having first and second radially extending flanges joined by a cylindrical portion within one mold part, engaging the first flange near a radially inner edge portion thereof with a movable mold member, and moving the mold member axially of the seal casing with an outer surface of the mold member engaging the first flange to establish a flash barrier between the mold member and the seal case. The force exerted in moving the mold member forms a flash barrier between another portion of the seal casing and the fixed mold member. The cylindrical portion of the case may be deflected slightly radially outwardly at least during forming, in response to engagement of portions thereof with a mold and in response to the fluid pressures generated when the sealing material is molded in place within the casing.

---

This invention relates to a new and improved shaft seal and a method of molding the same. The novel seal and molding technique permits it to be economically made in a flash-free manner to unusually small radial dimensions. The external configuration of the stamping may be controlled through use of the pressure of the mold material to provide additional advantages and economy in manufacture.

It is an object of this invention to provide an improved shaft seal having a novel method of anchoring the sealing element to a metallic casing.

It is a further object of this invention to provide an improved shaft seal which due to its unique construction and novel method of manufacture, may be made radially thin.

It is a further object of this invention to provide a novel method of securing a sealing element to a case member in a flash-free manner.

It is a further object of this invention to provide a method for making a shaft seal of the compression molded type which can be economically produced without any sacrifice in quality.

It is a still further object of this invention to provide a new and improved molding process permitting the use of metal case members which are economically formed within a wide range of tolerances.

Additional objects and advantages will appear on consideration of the accompanying drawings and detailed description of preferred forms of the invention.

In the drawings:

FIG. 1 is a fragmentary partly sectioned perspective view of a shaft seal of the present invention;

FIG. 2 is a view similar to FIG. 1 of a modified form of shaft seal;

FIG. 3 is an enlarged fragmentary half section of upper and lower mold halves which co-operate to form the seal of FIG. 1 and which illustrates the case member in position within a center plate and the mold halves at the initial contact position;

FIG. 4 is a view similar to FIG. 3 with the mold halves fully closed during formation of the seal shown in FIG. 1; and FIG. 5 is a view similar to FIG. 4 illustrating mold halves having the cavity modified to form the seal shown in FIG. 2.

Referring now to FIG. 1, a shaft seal is indicated generally by the reference numeral 10 and includes a metal casing 11 having a circumferential portion 12 with inwardly projecting flanges 13 and 14 at opposite end portions thereof. Attached to the inner periphery 16 of the circumferential portion 12 is an elastomeric sealing element indicated generally at 15. The sealing element 15 is continuously joined to the metal casing 11 along the inturned flange 14, circumferential portion 16, and along an axially facing, radially extending surface 17 on the flange 13. The elastomeric sealing element 15 extends around the inner periphery 18 of the flange 13 and part way up the outer surface 19 terminating in a sharply defined annular pattern 20. Depending upon the particular design, the mold material may cover the entire outer surface of the flange 13 and can include an excluder lip 23 of any desired shape. As is evident in FIG. 1, the sealing element 15 is joined to the casing over a substantial area to insure a good metal-to-rubber bond or anchoring portion.

The sealing element 15 includes a shaft contacting lip portion 21 having an annular spring receiving groove 22 positioned directly above the shaft contacting portion 21. The excluder lip 23 may be omitted if desired, however, it is particularly useful in applications where large quantities of foreign matter such as dust, dirt and the like are likely to be encountered. Obviously, the excluder lip 23 and the primary sealing lip 21 may take any desired shape since the final configuration is easily controlled through modifying the shape of the cavity in the co-operating mold halves.

A modified form of the invention is illustrated in the fragmentary partly sectioned perspective view of FIG. 2, having an annular casing 31 which is of similar design to the casing 11 having inturned flanges 32 and 33. The flange 32 forms the major bond portion and has the seal element 34 molded along the entire inner surface 35 around the inner periphery 36 and substantially covers the outer radially extending surface 37, with the exception of notch-like openings 38 formed by the supporting pad portions on the lower mold half. The material forming the sealing element 34 is formed into an enlarged or bulbous portion 39 to provide a heel gasket to seal the metal casing 31 tightly to the machine bore in which it is installed.

Referring now to FIG. 3, the method of molding the seal of FIG. 1 in a flash free manner will be described. In FIG. 3 is shown a fragmentary portion of a flashless molding arrangement. An upper mold half or plunger 40 is carried by a molding press in a conventional manner. The lower mold half, indicated generally at 41, rests on a suitable platen (not shown) and includes a center post 42 and floating lower mold 43. A center plate 44 surrounds a cavity formed in the lower mold 43 and serves to confine the metal casing 11 around the circumferential portion 12. The metal casing 11 may be formed from metal plate in a known manner which includes piercing and curling to form radially directed flanges 13 and 14.

As seen in FIGS. 3 and 4, the center post 42 has a radial end surface portion 45 which serves as a stop for engagement with the upper mold half 40, to limit the descent of the upper mold half 40. The upper mold half 40 has an annular plunger portion 46 which is of cylindrical configuration at its lower end and merges with a frusto-conical portion 47, which terminates in a cylindrical portion 48 of increased size. Along the inner peripheral portion of the plunger 46 is provided a cylindrical wall portion 50 having a raised land 51 which serves to mold a groove in the sealing lip to accommodate a garter spring of known form. The lower end of the plunger 52 joins a tapered end 53 having radii at the inner and outer margins.

The center post 42 is provided with a radial shoulder 54 which merges with a lip forming frusto-conical surface 55 reversely bent as at 56 to form the exclusionary lip. Obviously, these surfaces may be formed to any desired shape to enable molding a single or multiple lip design of any particular configuration. In the design shown, the floating lower mold 43 is provided with an annular upstanding portion or land 57 which serves to provide a bend point for the exclusionary lip. Outwardly of the land 57, the groove terminates with a radius portion 58 which joins a radial surface 59 serving to support the flange 13. An annulus of elastomeric material or a "prep" 60 as it is referred to in the trade, is loaded into the lower mold resting on the shoulder 54. The center plate 44 is positioned around the stamping or casing 11 in the manner shown.

The center plate 44 may be provided with an annular opening 61 which may be concave in cross section. The degree of concavity may be such that the radius at the center is of the order of about three-thousandths inch greater than the ends, such being exaggerated in the drawings merely for purposes of illustration. The size of the opening in the center plate at opposite sides may be slightly greater than the outside diameter of the stamping 11 to permit easy placement. Obviously, a center plate having a purely cylindrical opening may be used in lieu of a center plate having concave openings as shown.

As the upper mold 40 moves downwardly, it contacts the radially extending flange 14 adjacent its inner margin as well as the "prep" 60. Continued downward travel of the plunger 46 urges the flange 13 into tight engagement with the surface 59 on the lower mold 53. As mold travel continues, the flange 14 is deformed radially outwardly by the cylindrical surface 46 on the plunger entering, while the "prep" 60 is being forced into the cavity.

As the upper mold 40 approaches the final position whereby it engages the radial surface 45, the frusto-conical surface 47 on the plunger engages the radial flange 14 causing a slight decrease in the mold cavity volume. Such decrease occurs only after the mold cavity has been filled causing a marked increase in pressure. This pressure with the force developed by the plunger 40 maintains the flange 13 in tight engagement with the surface 59 precluding the passage of flash. Simultaneously the extremely high pressure generated by the mold material deforms the circumferential portion 11 of the stamping to the convex form shown. If the center plate is provided with a cylindrical opening, the entire circumferential portion 11 will be stretched into tight engagement with the bore 61 of the center plate.

Since the plunger engages the flange 14 it bends it downwardly and converts it to an inverted curl during the molding operation, the pressure of the elastomeric compound forming the seal element acts against the inner surface of the turnover or flange 14, causing it to remain in tight engagement with the outer cylindrical and tapered surfaces of the barrel 46 of the mold 40. Additional pressure is generated when the frusto-conical wall 47 further expands the flange 14. In addition to the forces developed by the mold material, the tensile force in the metal resisting the stretching will assist in maintaining a flash barrier. The axial dimension of the finished seal may be easily controlled by the location of the break point 62 at the junction of the flange 14 and circumferential portion 11. In this manner, the axial dimension may be designed and held to reasonably close tolerances during manufacture.

When the elastomer has cured to the degree necessary to permit removal from the mold, the plunger 40 is elevated, and the finished seal 10 may be stripped from the mold by conventional techniques. Any flash which has rise around the center post will be eliminated when the lip is trimmed by known methods. No other flash will be present, as the barriers along the upper and lower mold halves will be established before or simultaneously with the flow of mold material and will remain effective throughout the entire period of mold travel. When the plunger is removed, the casing 11 will return to its original diameter if the elastic limits of the metal used have not been exceeded. For example, expansion of a steel stamping a few thousandths of an inch is well within the elastic limit in most cases and during such expansion the stamping will not usually take a permanent set. If the casing or stamping is undersized more than this amount, the molding operation will expand it beyond its elastic limit, causing it to take a permanent set with the ultimate size being controlled by the size of the opening in the center plate 44.

The importance of the elastic characteristic of the stamping is best understood by a specific example. Assume that a final seal size of 3.001 inches in diameter is desired. Assume further that the stampings vary in diameter from 2.999 to 3.003 inches as measured on a diameter at the ends, with the central circumferential portion having a valley or concavity about 0.002 inch deep. Under the stated hypothetical conditions, the opening in a center plate may be designed to have an end diameter of 3.004 inches and a mid-point diameter of 3.006 (concavity). During molding, the valley portion of the stamping is stretched beyond its elastic limit, but will recover its elastic limit or about 0.003 inch, to have a final mid-point diameter of about 3.003 inches. The end diameters fall within the acceptable range of 2.999 inches to 3.003 inches, making the molded seal easily removed from the center plate opening.

The above example is indicative of the dimensional control which can be obtained by the present molding process using stampings made within rather loose tolerances. The final size of the seal can be compensated for in the center plate design and accordingly, stampings need not be made to the usual close tolerances or subsequently ground or buffed or the like since the molding operation will serve to finish them. Certain advantages are derived when the stamping is made convex in cross section as illustrated. For example, a lead-in portion is provided at opposite ends of the casing to enhance the ease of installation. The enlarged center of the casing will form a fluidtight fit with the bore in which it is positioned since it may be designed slightly oversized.

In the emodiment of FIG. 5, the mold members are illustrated in the closed position to form a seal element forming cavity 70 which determines the final shape of the sealing element 34 shown in FIG. 2. The seal element forming cavity 70 extends from the flange 33 on the casing 31 along the inner circumference of the casing and around the flange 32 with a flash barrier formed at 71 in the center plate 73.

A lower mold half 74 has spaced upstanding support pads 75 supporting the flange 32 to permit the mold material to engulf the axially facing surface 37. The recesses 38 are formed by the spaced support pads 75 on the lower mold which permits the mold material to flow radially outward to form a heel gasket 39. The center post 76 and upper mold half 77 may be of the same construction as described in conjunction with FIGS. 3 and 4.

The plunger 78 on the upper mold half has the cylindrical surface 79 and frusto-conical surface 80 engaging the flange 33 through the initial and final increments of mold travel, respectively. Accordingly, the flash barrier at the tip of the flange 33 will be maintained throughout the entire molding sequence. The re-sizing or radial stretching of the metal casing 31 under the pressure of the mold material is of such magnitude that it forms a tight flash barrier at 71 to preclude any elastomer flow along the outer periphery of the casing. The casing may be formed to the convex shape shown from a purely cylindrical configuration or may be formed to a final configuration which is purely cylindrical depending upon the shape of the opening 81 in the center plate 73.

Stampings which are undersized will be stretched radially during the molding operation and return within their elastic limit a slight amount which permits easy removal from the center plate 73 in the manner described in conjunction with FIGS. 3 and 4. Through the formation of a heel gasket 39, the quality of the stamping forming the casing becomes less significant since reliance is made on the gasket action between heel gasket 39 and the machine housing or bore or prevent fluid from escaping along the outer circumference of the shaft seal.

The novel molding method does not rely on the structural strength of the stamping alone but uses the hydraulic pressure to assist in the establishment of a flash barrier. In addition, the radially directed mold pressure assists the axial forces in maintaining a flash barrier along the flange to which the seal element is bonded. The present design, because of this unique principle, permits the simultaneous formation of a heel gasket as well as permitting small radial sections to be formed. Obviously, the flange 32 or flange 13 in either of the seal designs may be formed to other configurations than the right angular form shown if desired since the flange or foot portion is not subject to reforming during molding nor is reliance placed on it for stopping the mold travel and therefore the tolerances or dimension of the same are not critical. The coating of the interior of the metal casing with elastomer not only serves to protect the same against corrosion but also provides an increased anchoring area to hold the lip to the sealing element of the casing.

Obviously, the principles of manufacturing the present seal may be applicable to seals of increased radial thickness as well as reduced radial thickness. As the flash barriers are established at points removed from the actual sealing lip per se, a wide range of sealing lip configurations are available. Diverse types of exclusionary lips, heel gaskets, and the like may be formed in a single molding operation by appropriately shaping the cavity between the flash barriers. While a shoulder has been illustrated to support the prep, it is contemplated that this is unnecessary and may be omitted, at least, in seal sizes of one inch or less, since the flash barriers are established by initial contact of the mold and stamping.

Upon a consideration of the foregoing, it will become obvious to those skilled in the art that various modifications may be made without departing from the invention embodied herein. Therefore, only such limitations should be imposed as are indicated by the spirit and scope of the appended claims.

I claim:
1. The method of flashless molding of an elastomeric sealing member in place within an annular metal casing member which includes first and second radially extending flanges joined by an axially extending cylindrical portion, comprising engaging said first flange near a radially inner edge portion thereof with a portion of a first mold member, engaging said casing member in a region near the junction of said second flange and said cylindrical portion with a second mold member, portions of said first and second mold members at least partially defining, in the closed position thereof, a mold cavity, moving said first mold member axially of said seal member with a radially outer surface of said mold member in snug engagement with said first flange to establish a flash barrier between said second mold member and said first flange, to exert a force axially of said casing member to establish a flash barrier between said second mold member and the portion of said casing engaged thereby, and thereby forcing said cylindrical portion at least temporarily radially outwardly while filling the cavity formed by said casing and said mold members with an elastomeric material to be bonded to said casing member.

2. A method as defined in claim 1 in which said region is on an outer surface of said second flange and spaced radially outwardly from the innermost edge thereof.

3. A method as defined in claim 1 in which said region is on an outer surface of said cylindrical portion and closely adjacent the junction of said cylindrical portion and said second flange.

4. A method as defined in claim 1 in which said first flange has a portion thereof formed into a generally axially extending second cylindrical portion generally parallel to said first cylindrical portion by contact with said first mold member.

5. A method as defined in claim 1 in which said first mold member includes a portion having a slight, increased diameter taper for enlarging the inside diameter of the first flange portion near the end of the axial movement of said first mold portion.

6. A method as defined in claim 1 in which said first mold portion is moved a distance of at least one third of the axial extent of said cylindrical portion during molding of said sealing member while said mold portion engages said flange.

7. A method as defined in claim 1 which includes providing an additional mold portion around the outer circumference of said cylindrical portion for limiting outward movement thereof, and forming said cylindrical portion into a shape complementary to the shape of said additional mold portion.

8. A method as defined in claim 7 in which said shape into which said cylindrical portion is formed is convex in cross-section.

References Cited

UNITED STATES PATENTS

| | | | |
|---|---|---|---|
| 2,700,186 | 1/1955 | Stover | 264—268 |
| 2,772,012 | 11/1956 | Crabtree | 215—40 |
| 2,982,999 | 5/1961 | Stewart | 29—472.9 |
| 3,090,996 | 5/1963 | Reichenbach et al. | 29—527 |
| 3,276,114 | 10/1966 | Blaurock | 29—527 |
| 3,276,115 | 10/1966 | Hansz | 29—527 |

JOHN F. CAMPBELL, Primary Examiner

D. C. REILLY, Assistant Examiner

U.S. Cl. X.R.

264—276